May 17, 1932.  M. PHILIPSEN  1,858,718
MEDICAL THERMOMETER
Filed Jan. 9, 1929
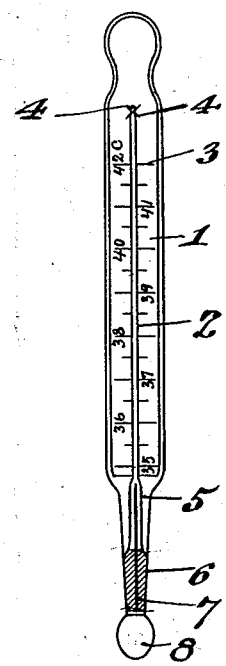
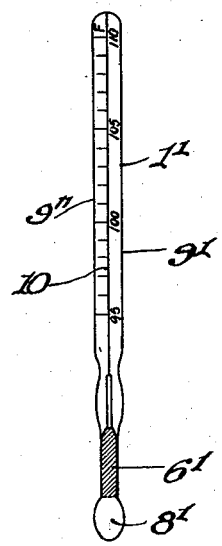
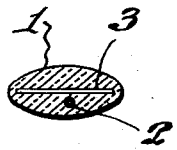
Inventor:
Michael Philipsen
By
Attorney Patented May 17, 1932

1,858,718

UNITED STATES PATENT OFFICE

MICHAEL PHILIPSEN, OF VEDBÆK, DENMARK

MEDICAL THERMOMETER

Application filed January 9, 1929, Serial No. 331,335, and in Denmark March 28, 1928.

The ordinary medical thermometers used for measuring the human temperature in the mouth or in the rectum are provided with a mercury container of oblong shape more or less pointed at its extremity. This construction involves the drawback, especially in the event of measuring the temperature in the rectum, that the mucous membrane is irritated and may even be injured, with the result that serious bleeding can be occasioned, as has been mentioned in the professional literature of late. Children, and adults suffering from hemorrhoids or forced to keep to their bed and lie on their back, are particularly sensitive to the said inconvenience, the result being that the operator must content himself with introducing the mercury container of the thermometer to some extent into the anus, if he is not skilled enough to introduce it to its proper depth after lubricating its surface, without interfering with the folds of the mucous membrane of the anus. Besides, the lubrication of the surface of the container makes it liable to slip out from its position, if not supported by hand from outside.

In order to overcome the said drawbacks and inconveniences it has been proposed to use a mercury container in the shape of a ball, the so-called Leyser-thermometer. Such thermometers, however, have never come into general use, because the ball-shaped mercury container is rather heavy and too risky in the event of breakage in the rectum and, besides, on account of the action of the thermometer being too slow and uneven, its surface being too small relatively to its volume of mercury, the central parts of which will not come into direct contact with the mucous membrane.

The present invention has for its object to provide a thermometer in which the said drawbacks have been overcome. According to my invention I attain this object by making the mercury container of the thermometer in the form of a cylindrical hollow body having a thin wall and by providing at the end of said container a solid or hollow body arranged coaxial with the container and projecting laterally beyond the same.

By this arrangement of the thermometer end it can easily and safely penetrate the anus and be brought into a position in which the body on the end of the mercury container will be located in the rectum or lower bowel, just inside the so-called sphincter, from which position it will not be liable to slip out through the anus as the said extension will oppose any accidental displacement of the thermometer. On account of the shape of the said body it will not irritate or injure the mucous membrane of the anus, nor interfere with its recesses or folds during its introduction through the same.

In order that my invention may be fully understood I have shown in the accompanying drawings by way of example two embodiments of the same, viz. in Fig. 1 a front view of a thermometer with centigrade scale of the shape commonly used in Europe, and in Fig. 2 a front view of a thermometer with Fahrenheit scale of the shape ordinarily used in America. Figs. 3 and 4 are cross-sectional views taken centrally through Figs. 1 and 2, respectively.

In Fig. 1 the flat glass casing 1 contains the capillary tube 2 and the metallic scale 3 divided in centigrades. The upper end of the capillary tube is held in position by two lugs 4 stamped out from the scale 3, and at its lower end the capillary tube is widened into a short tube 5 forming an upper narrowed extension of the mercury container 6, the wall of which is extended into the wall of the casing 1. In the container 6 is inserted the ordinary glass pin or hair 7 which is fixed at the bottom of the container 6 and extends through the same and its extension 5, constricting the cross-section of the mercury column in the latter to such an extent that, after rise of the mercury column into its final position in the capillary tube according to the temperature measured, the subsequent cooling of the thermometer will interrupt the mercury column at the lower end of the capillary tube, and said column will remain thus in the tube until, after the temperature has been read, the column is afterwards slung down in the container in the usual way.

At the extreme end of the mercury container there is attached a smooth surfaced oval shaped solid or hollow glass body 8 extending laterally from the container. This body can be coloured, if desired, in any suitable manner, whereby it will indicate, for instance, thermometers for use in different departments of hospitals.

In the type shown in Fig. 2 the capillary tube is formed in a body 1' having a triangular cross-section (Fig. 4) and three edges 9', 9" and 10. 6' is the mercury container and 8' its lower extension which contains no mercury.

Regardless of the shape or style of the thermometer casing, the entrance body 8 or 8' is substantially oval shaped so that it will pass through the sphincter without obstruction and be disposed in the end of the lower bowel, at which time the restricted portion 6 containing the temperature responsive fluid will be gripped by the sphincter which affords the most correct measure of the true temperature of the human body. The shoulders at the end of the casing adjacent the container 6 act in conjunction with the body 8 in positioning the thermometer so that the temperature responsive fluid in the container 6 will be directly subjected to the temperature of the sphincter outside of the bowel and hence unaffected by other elements. It will be noted that the container 6 is also of a character which affords a maximum surface area, whereas thermometers heretofore known with a rounded mercury container at their end embody a relatively small amount of surface area, and furthermore such thermometers disposed the container within the bowel so that only a casual or approximate reading of the true temperature of the body is possible.

It should be apparent from the foregoing that the structure and design of my thermometer assures that it will always be positioned and maintained in correct position with the temperature responsive fluid distributed over a relatively large area and subject to temperatures of a membrane of the body rather than elements not a part of the body. Furthermore, the construction is such that the thermometer is self-seating so that the temperatures will always be taken at one and the same position of the temperature responsive fluid relative to the sphincter.

The outer shape of the thermometer according to my invention can be varied without departing from the principle of my invention to suit different taste or different types of medical thermometers, or for measuring the temperature in other bodily cavities than the rectum of the human body.

Having now particularly described and ascertained the nature of my said invention and in what manner the same is to be performed I declare that what I claim is:—

1. A thermometer of the character described including a casing with an indicating scale and a passage for a temperature responsive fluid extending through said casing adjacent the scale, a substantially oval shaped entrance body at one end of the thermometer, and a reduced cylindrical portion of smaller cross-sectional area than the casing and entrance body connecting said casing and entrance body, said portion having a bore communicating with said passage in the casing but not communicating with the entrance body, and a quantity of temperature responsive fluid in said portion.

2. In a thermometer of the character described having a casing with a passage and temperature indicating means, and a substantially oval shaped entrance body coaxial therewith, a mercury container connecting said casing and entrance body and comprising an elongated cylindrical member having a bore with its end adjacent the entrance body closed and its end adjacent the casing open and in communication with the passage therein, said container being of considerably less cross-sectional area than the entrance body and casing whereby said container does not reach into the bowel but is accurately positioned against a membrane outside the bowel.

In testimony whereof he affixes his signature.

MICHAEL PHILIPSEN.